Aug. 26, 1969  F. J. CARON ET AL  3,463,063
VEHICULAR WHEEL FOR COMPACTING SANITARY FILL
Filed April 1, 1968  5 Sheets-Sheet 1

FIG_1

FIG_2

INVENTORS
FRED JOSEPH CARON
ORVILLE G. BARNUM

BY

ATTORNEYS

Aug. 26, 1969　　F. J. CARON ET AL　　3,463,063
VEHICULAR WHEEL FOR COMPACTING SANITARY FILL
Filed April 1, 1968　　5 Sheets-Sheet 2

FIG_3

FIG_4

FIG_5

FIG_6

INVENTORS
FRED JOSEPH CARON
ORVILLE G. BARNUM
BY *Flehr, Hohbach, Vest,*
*Albritton & Herbert*

ATTORNEYS

FIG_7

FIG_9

FIG_8

FIG_11

FIG_12

FIG_13

FIG_10

FIG_10A

INVENTORS
FRED JOSEPH CARON
ORVILLE G. BARNUM
BY
ATTORNEYS

FIG_14

FIG_15

FIG_17

FIG_16

INVENTORS
FRED JOSEPH CARON
BY ORVILLE G. BARNUM

ATTORNEYS

United States Patent Office 3,463,063
Patented Aug. 26, 1969

3,463,063
VEHICULAR WHEEL FOR COMPACTING SANITARY FILL
Fred Joseph Caron, Citrus Heights, and Orville G. Barnum, South San Francisco, Calif., assignors, by mesne assignments, to Rex Chainbelt Inc., Milwaukee, Wis., a corporation of Wisconsin
Continuation-in-part of applications Ser. No. 558,306, June 17, 1966, and Ser. No. 645,680, June 13, 1967. This application Apr. 1, 1968, Ser. No. 717,580
Int. Cl. E01c 19/26
U.S. Cl. 94—50                    8 Claims

ABSTRACT OF THE DISCLOSURE

A compaction roll or wheel is equipped with symmetrical, wedge-shaped cleats arranged in a pattern of staggered, circumferential rows. An inclined, open gap extends between the cleats across the wheel facilitating self-cleaning in both rotational directions. One cleat at a time presents a destructive edge to the six o'clock position, transmitting one quarter of the compacting vehicle's weight to the ground across the single edge.

This is a continuation-in-part of copending applications Ser. No. 558,306, filed June 17, 1966 and Ser. No. 645,680, filed June 13, 1967, both now abandoned.

BACKGROUND OF THE INVENTION

This invention concerns generally compaction machinery and particularly relates to an improved wheel for mounting upon a compaction vehicle, the wheel being adapted to break up, crush, grind, and compact materials encountered in sanitary land fill operations.

Near urban centers sanitary land fill operations represent an important industry. The volume of dry refuse placed for disposal each day has created vast disposal problems and swamp land, shallow lakes, and bays are frequently used as dumps, the refuse there being covered with an earth layer to form eventually reclaimed land suitable for some building purposes. Because available land near urban centers is limited, the operators of refuse dumps seek to use their land as efficiently as possible to contain the greatest amount of dry refuse. A method which promotes efficient use of land is compaction of the dry refuse used as fill by means of a self-powered compaction vehicle. Such a vehicle, it has been found, is capable of applying to the fill compaction loads, on the order of 400 pounds per lineal inch.

Lumber and concrete from demolished buildings, cast-off refrigerators and bed springs, and barrels, are all encountered in sanitary fill compaction operations. Desirably this material must be crushed, ground or broken up so that it will occupy a smaller volume. Track laying vehicles, which by design are "buoyant," are not entirely satisfactory at this for reasons including the inability of a track to apply a high compaction load. Moreover, the track gear tends to become clogged with refuse such as bed springs or cables which results in expensive down time to clear the track gear.

The prior art pertaining to compaction wheels or rolls shows generally two distinct types of wheels: the non-buoyant or surface penetrating wheel, such as the sheepsfoot roll, and the buoyant wheel such as the smooth-surfaced cylindrical roll and the segmented rolls.

The sheepsfoot roll is a penetrating and non-buoyant roll because its working area of contact with the earth material is relatively small by comparison with other rolls. On the other hand the sheepsfoot roll has a very high destructive capacity in that the individual lugs on the sheepsfoot "punch" through the material instead of rolling on top of it. The result of this characteristic is that it cannot be used for finished work in sanitary fill operations since it is inherently non-buoyant and, in addition, has a strong tendency to cause "fluffing" or loosening of the surface material and partial destruction of the surface being compacted. Fluffing is especially objectionable in the case of a powered sheepsfoot wheel ascending a grade common to sanitary fill operations in that the fluffing or digging out effect of the individual lugs causes the wheel to lose traction and eventually to dig a rut. A sheepsfoot roll tends to clog rapidly with the typical refuse of garbage dumps.

The smooth surface cylindrical roll has high "buoyancy" with respect to material upon which it rolls and has a large working area in contact with that material which gives rise to a serious practical disadvantage in working the loose material at a sanitary fill site. The smooth cylindrical roll builds up a moving wave or wedge of loose material just ahead of its path. The wedge is pushed ahead of the roll and constantly increases in size until one of several undesirable conditions results. The wedge may become so large that the compaction machine is stalled, or, if the machine may manage to climb over the wedge, it will leave behind a large, poorly packed defect. The climbing effect occurs rather regularly and not only leaves a series of defects but requires the machine to have a reserve of horsepower not used during the regular rolling function but necessary to climb such defects. The smooth surface roll is undesirable, therefore, in sanitary fill operations for the reason that it lacks the necessary traction ability and also lacks the required destruction ability.

Segmented rolls are generally the buoyant type having a large contact area causing them to float upon segments or "pads." The contact area or working area of the segmented roll is greater than that for the sheepsfoot but less than that for the smooth cylindrical surface roll. Rolls of this general type are disclosed in the Patent No. 2,895,390 to A. W. Gardner. The segmented roll has shortcomings in sanitary fill operation in that it lacks the desired high destructive ability and requires rakers or cleaners to maintain the spaces between the pads free and clear from clogging refuse. It has been found that rakers or cleaners used on segmented wheels and the like quickly become seriously clogged with materials in sanitary fill operations requiring the operator to shut down the machine for cleaning the rakers and wheel.

A special variety of the segmented type roller is shown in the Patent No. 3,067,658 to D. A. Palmiter. This patent shows a hollow drum having a plurality of pads arranged in alternately aligned annular rows with a cleaner or raker between adjacent rows. The pads have a non-symmetrical, arched, working surface to perform the compaction function in one direction only. This type of wheel is intended principally for compaction and lacks the required destructive capacity and self-cleaning character desired for sanitary fill compaction service.

A general object of the present invention is to provide an improved wheel for mounting on a vehicle useful in compacting sanitary fill, the wheel being adapted to crush, grind, and break up trash and the like materials encountered in sanitary land fill or refuse dump operations.

Another object of the invention is to provide a wheel of the type described having high traction characteristics to enable the vehicle to climb steep banks and high compaction characteristics over a large contact or working area consistent with a destructive capability to break up, crush, and batter solid objects found at refuse dump sites.

Another object of the invention is to provide a wheel of the type described which obviates the need for cleaners or rakers in that is equipped with a self-cleaning and dirt ejecting pattern of cleat members and provided with trash deflection means serving to prevent collection of debris upon the wheel and particularly about the wheel hub.

Additional objects and features of the invention will appear from the following description in which the preferred embodiments have been set forth in detail in conjunction with the accompanying drawings.

SUMMARY OF THE INVENTION

An improved compaction wheel is provided with a plurality of annular rows of wedge-shaped cleat members arranged in a pattern over a cylindrical surface so that not more than one cleat at a time, and its cutting edge, is in the six o'clock position. The cleat members are spaced apart and staggered to provide a bi-directional self-cleaning arrangement by forming an inclined, open, dirt-ejection slot across the cylindrical surface.

DESCRIPTION OF THE PREFERRED EMBODIMENTS

Figure 1:
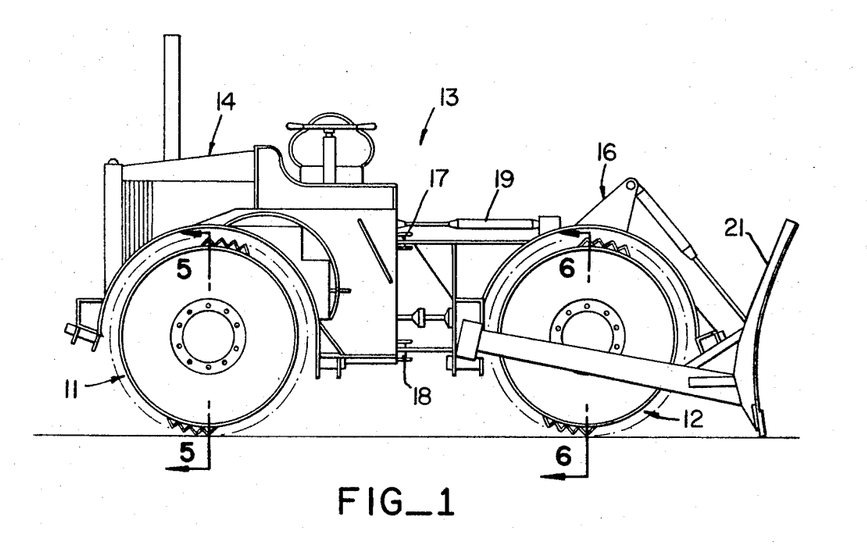
FIGURE 1 is a side elevational view showing a compaction vehicle equipped with wheels of one preferred embodiment of the invention.
Figure 2:
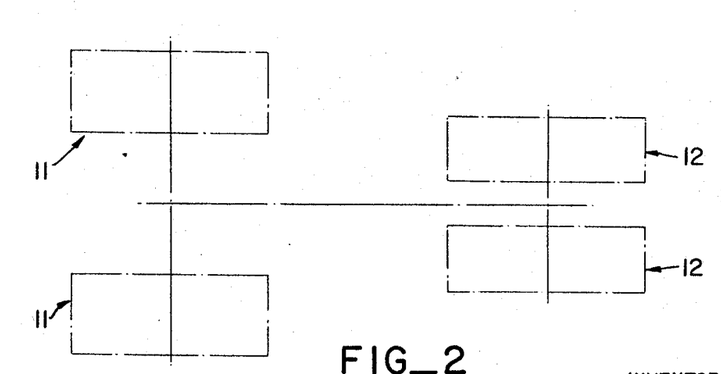
FIGURE 2 is a schematic plan view of the arrangement of the two pairs of wheels mounted on the compactor vehicle in FIGURE 1.

As shown in FIGURE 1, the wheels 11 and 12 are mounted upon a compaction vehicle 13 which is preferably of the heavy duty type and may have a gross weight as high as 22 tons. The vehicle 13 consists of a main body part 14 carried by a pair of ground-engaging wheels 11, and a second body part 16 provided with the relatively closely set pair of ground-engaging wheels 12. The pivoted connections 17 and 18 between the two body parts permit articulation about a vertical axis to steer the vehicle and steering forces may be provided by the hydraulic rams 19. One end of the vehicle may be provided with a vertically adjustable bull-dozer blade 21.

The main body part 14 carries the driving motor which is operatively connected to the wheels 11 and 12 through a change gear transmission and differential (not shown).

Figure 5:
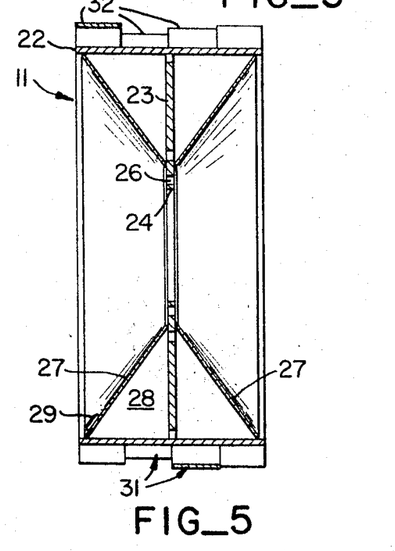
FIGURE 5 is a sectional view on an enlarged scale taken of the direction of the arrows along the line of 5—5 of FIGURE 1.
Figure 6:
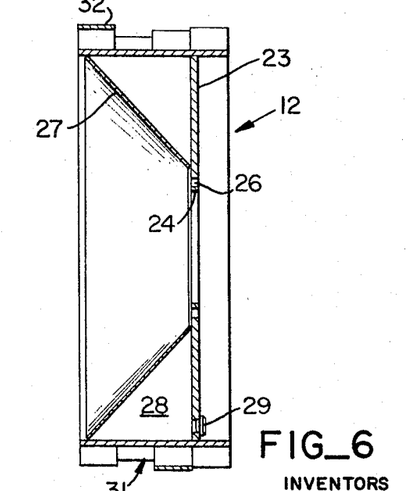
FIGURE 6 is a sectional view taken in the direction of the arrows along the line 6—6 of FIGURE 1.

In accordance with one embodiment of the invention the wheels 11 are preferably constructed as shown in FIGURE 5 and the wheels 12 on the second body part 16 are preferably constructed as shown in FIGURE 6. In this specification the wheel 11 will be considered in detail and the wheel 12 will be considered and described herein only as to the points of difference it has from the wheel 11. In each case, the wheel of the present invention may be compared to a drum which includes a rigid cylindrical rim 22 having rigidly secured thereto a circular diaphragm or spider 23. The center of the diaphragm is provided with an aperture 24 to receive therethrough the end of an anxle (not shown) which may be of a conventional heavy-duty arrangement. The aperture 24 is surrounded with a circle of bolt holes 26 for mounting the wheel onto the hub of the axle assembly by means of conventional stud and lug fasteners.

A concave, conically shaped member 27 is rigidly secured to the rim 22 and the diaphragm 23. The conical member 27 serves to reinforce the wheel 11 and to define with the diaphragm 23 a ballast compartment 28 which may be filled through a coupling 29 with water to increase the weight of the wheel. The conically shaped member 27 also serves to exclude from collection on the wheel refuse and the like, and to prevent such from becoming entwined about the wheel to impede its operation. It is appreciated that other arrangements may be devised for mounting a cylindrical or drum-like traction rim upon a vehicle to drive the traction rim from the power axle of the vehicle. Thus, the present invention will not be so limited to only the exemplary constructions disclosed herein.

Figure 3:
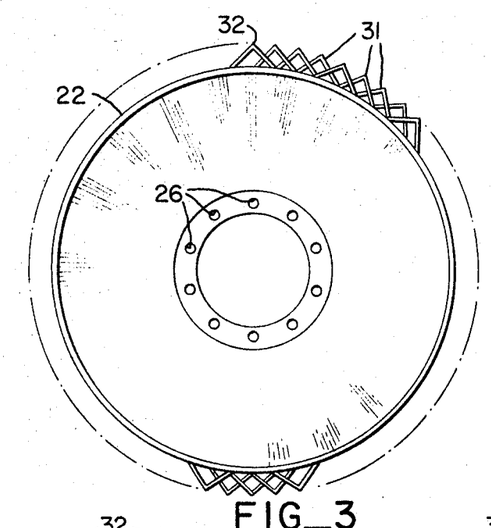
FIGURE 3 is a side elevational view, on an enlarged scale, of a wheel shown in FIGURE 1.
Figure 4:
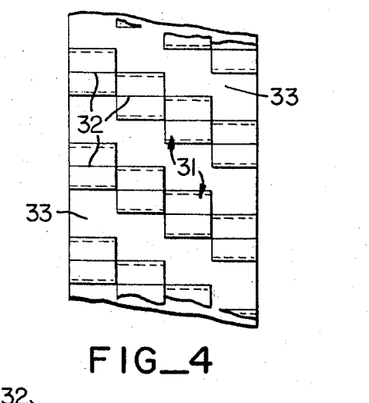
FIGURE 4 is a flat development view showing the arrangement of cleat members on the wheel of FIGURE 3.

To enable the compaction vehicle 13 to work efficiently on sanitary land fill projects, each of its wheels is equipped with a plurality of destructive V or wedge-shaped cleat members or cleats 31 shown in FIGURES 3 and 4. The cleat members 31 are arranged in annular rows extending circumferentially about the outer surface of the rim 22. Four contiguous, side-by-side rows of cleats are shown in the preferred embodiment of the invention of FIGURES 1–7 and 12, the rows of cleats being lettered A through D in FIGURE 7. It has been found mechanically advantageous as well as economical to form the cleats 31 from structural angles having in cross-section legs of equal length and to weld the toe of the legs to the peripheral rim 22 so as to define in section an outwardly projecting inverted V or wedge shape having wedge faces 31a and 31b. The cleat members in each row are circumferentially spaced apart to leave a circumferential gap 35 over the cylindrical surface between a compacting or wedge face 31a and a trailing face 31b of the next cleat member in the row. Considered axially or transverely of the wheel, the distribution of the gaps 35 in adjacent rows provide an advantageous inclined dirt ejection slot 33 extending obliquely across the drum surface. The advantageous function of the slot 33 will be described more fully below. A destructive cutting edge 32 is provided by each cleat and extends generally parallel to axis of the wheel. The destructive cutting edges 32 serve to cut, crush and grind materials such as lumber, bedsprings, barrels and the like which items are frequently found in refuse dumps.

Figures 10, 10A:
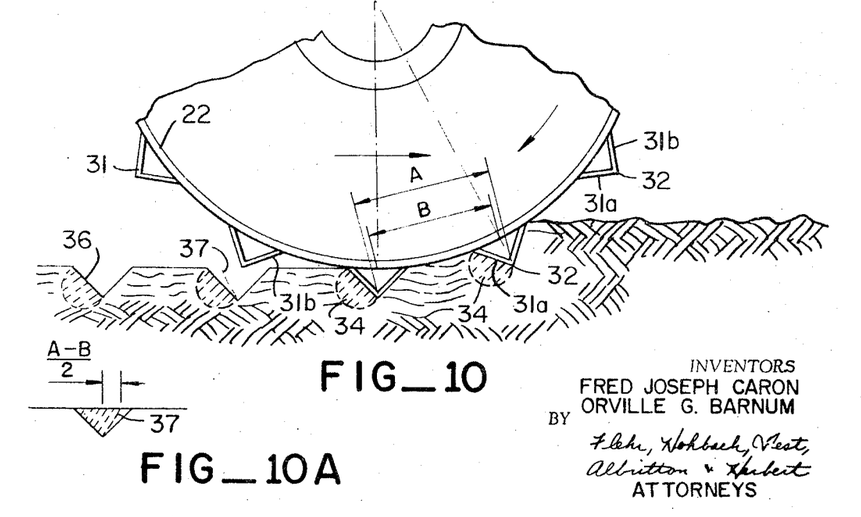
FIGURE 10 is a fragmentary elevational view, on an enlarged scale, showing the compaction effect of cleat members under operative conditions.
FIGURE 10a is a diagrammatic elevational view showing a pocket compacted by a cleat member.
Figure 11:
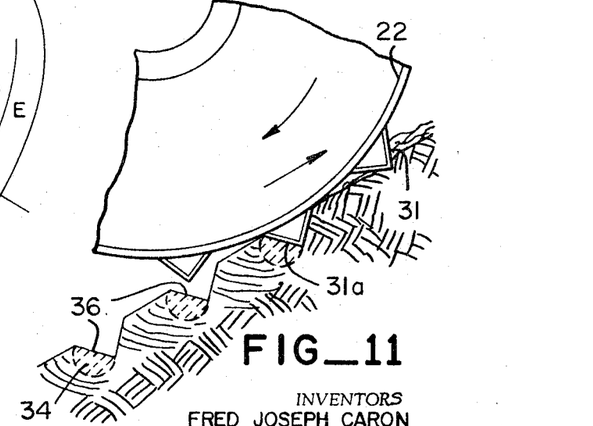
FIGURE 11 is a view like FIGURE 10 but showing the wheel of the present invention ascending a steep incline.

It has been found that the action of the inverted wedge-shape cleat mounted upon a drum permits high compaction with a much greater tractive force on inclines (as shown in FIGURE 11) and in loose material (as shown in FIGURE 10) than was obtained with other varieties of lugs such as the sheepsfoot or segmented pad. This effect appears to derive from the presentment of a compacting face 31a to the fill at a flat acute angle, as shown in FIGURE 10. As the powered wheel continues to roll, as shown by the arrows, the cleat member progresses into the ground, the cutting edge 32 passes to the six o'clock position producing a compacted zone or bulb 34 beneath the compacting face 31a. The cleat member thereby forms a pocket 36 in the fill. Upon further rotation, the trailing face 31b leaves the pocket 36 along an imaginary broken line 37 disposed inwardly of the bulb 34 and without distrubing the compressed bulb. This clean emergence from the ground or fill is in contrast to the action of a sharply inclined cleat or a sheepsfoot lug. In those constructions the cleat member digs out or cuts out on emerging from the ground and disturbs the compacted zone. It will be understood that the same series of events occur when the wheel is rotated in the direction opposite to the arrows of FIGURES 10 and 11, being that both the cleat members and the pattern of cleat members are symmetrical. Thus the instant wheel is bi-directional.

The wedge-shaped cleat member is mounted outwardly of the working rolling surface of the cylindrical rim 22. This permits the cleat member to trap fill material and to urge it rearwardly a distance which may be called the distance of regression. As shown in FIGURES 10 and 10a, the distance of regression may be calculated by the formula $$\frac{A-B}{2}$$

where A equals the chordal distance between adjacent cutting edges in a row, and B equals the chordal distance, measured at the rolling surface, between imaginary radial lines extending to the cutting edges 32. The distance of regression can be pictured as simply the distance the material is moved in the direction opposite to the direction of motion of the compaction wheel. The effect of moving the material rearwardly under power is to compact the material into a bulb of compression 34 or pressure bulb. The concept of pressure bulb is more fully explained by Donald W. Taylor in Fundamentals of Soil Mechanics, 1948, John Wiley & Sons, New York, pp. 566–571.

Referring to FIGURE 11, in this invention the importance of the pressure bulb or compaction bulb, is that when ascending an inclined, which may be as steep as 30°, each cleat has a compacted zone to work against. On a bank, the wedge-shaped cleat impresses and compacts a pocket 36 having a compressed bulb along one face to form, in effect, a step. Thus, when the compaction vehicle is climbing steep embankments there is provided downhill of each working cleat, a step so that the wheel may be thought of as moving up the embankment as moving up a series of steps. Being symmetrical about the cutting edge the cleat is equally efficient ascending or descending an incline. This is important on work in sanitary fill projects where the banks are steep and the fill is very loose. The net gain from the wedge-shaped cleat is a much greater tractive effort on inclines. This indicates a more efficient utilization of the available horsepower of the compaction vehicle.

Figure 12:
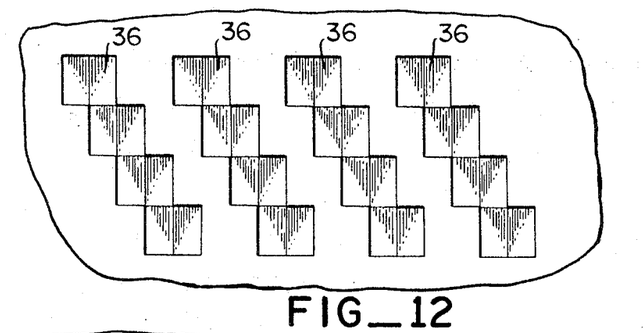
FIGURES 12 and 13 are plan views showing the compaction pattern left in the material rolled in one pass of a wheel, these compaction patterns representing the patterns created by the wheels shown in FIGURES 4 and 9, respectively.

The cleats in each circumferential row are staggered in one direction with respect to the cleats in the next adjacent row. The effect of this arrangement is to present the cleats to the ground one at a time and thus to apply substantially one-quarter of the vehicle's weight to the ground across a single cutting or destructive edge 32. An arrangement of cleat members of the preferred embodiment shown in FIGURES 1–7 has been found highly effective both from a destruction, traction, and compaction standpoint. In this arrangement the cleat members are staggered so that the distance between cutting edges in order of ground engaging sequence is less than half the circumferential spacing between cutting edges in each row as shown in FIGURES 4 and 12.

As clearly shown in those figures the stagger may also be considered as substantially one-half the circumferential base length of a cleat member measured along the circumference of the cylindrical rim 22. That is, and with specific reference to FIGURE 7, the cleat members in row A are staggered with respect to those in row B about one-half the circumferential base length of the cleat member. Thus in the case where the cleat members are arranged in four annular rows, A, B, C and D, no cutting edge 32 is in alignment with any other cutting edge of the wheel and the ground-engaging sequence of cleat members is consecutive across the wheel, i.e., A, B, C, and D. That is, a cleat member of row A first swings through the six o'clock position and is followed in order by a cleat member from row B, from row C, from row D, and then a second cleat member from row A. This shifting of one-quarter of the vehicle's weight from one cleat member to the other across the rim produces somewhat of a cog-wheel action. A heavy impact is produced by this action by reason of the vehicle's weight and velocity. In this manner high energies for destruction and compaction are transmited to the ground.

Figure 7:
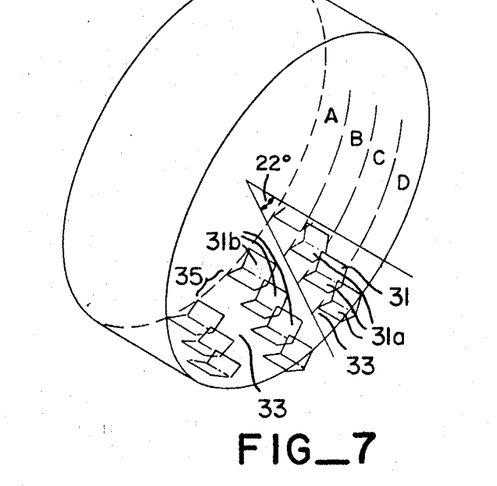
FIGURE 7 is a diagrammatic and perspective view showing the arrangement of the wedge-shaped cleat members in and about the six o'clock position.

The arrangement of cleat members mentioned above provides an open or unobstructed ejection slot 33 extending obliquely across the rim 22 at an angle of generally 22° with respect to the wheel axis, as shown in FIGURE 7. The slot affords a space between cutting edges into which materials such as lumber and the like may be deflected while being engaged and impacted by the cutting edges thus improving the destructive power of the wheel. The slot 33 defined by the legs of the structural angles formed by the cleats 32 is of such width, considered along the periphery of the rim, that earth, mud, and the like are to a large extent deterred from collecting on the wheel to impede its destructive function. The narrowest portion of the ejection slot 33 is at least the width of one-half the base length of a cleat member.

The ejection slot 33 may also be considered as having a dynamic self cleaning function produced by the natural slippage of a powered or tractional wheel which encourages the ejection of dirt through the slot 33. In this action the dirt leaves the trailing face 31b of one cleat member and is urged along the slot towards the compacting face 31a of the cleat member in the next row. Through successive action, encouraged by the natural slippage of the tractional wheel, some dirt finds its way through the slot and over the edge of the wheel. There is no blocking of the dirt action in this pattern. Moreover, the dirt ejecting or cleaning feature enables the subject wheel to operate without the use of cleaners or rakers found in the prior art. It has been found in sanitary fill operations that a wheel having an obstructed slot, one which is not open entirely across the wheel, will tend to became clogged rendering the wheel ineffective.

This pattern or arrangement of cleat members and ejection slots is bi-directional which enables the compaction vehicle to operate with equal efficiency, in two directions avoiding lost motion in turning the vehicle around.

In the case of the wheel 12 which is mounted in a pair upon the body portion 16, it has been found desirable to space these wheels close together so as to provide the desired action along the track between the wider spaced apart wheels 11 on the main body portion. The wheels 12 being closely spaced, the circular diaphragm 23 is set closer to one margin of the rim than the other, and a deeply concave conical member 27 is provided on only one side of the diaphragm 23. A coupling 29 is rigidly mounted through the diaphragm 23 to permit the ballast compartment to be filled with water or the like ballast.

An exemplary wheel according to the preferred embodiment shown in FIGURES 3–7, may have a cylindrical drum or rim 2 feet, 6 inches wide and 64½ inches in outside diameter. The cleat members may be structural angles 5 x 5 x ⅝ inches and 7½ inches long spaced apart 13.6136 inches, cutting edge to cutting edge, leaving about 6¹¹⁄₁₆ inches of gap over the drum surface. These cleat members have a base length of about 7 inches measured circumferentially over the rim. The stagger may be 3½ inches between adjacent rows. Sixty angles are required, 15 for each of the four rows per wheel.

The operation of the wheel of the present invention is as follows. Assume the condition to be that the wheels 11 and 12 are mounted upon a compaction vehicle which has a high gross weight. As the vehicle is driven across the refuse material to be cut up, crushed, and compacted the several cutting edges of the cleat members are pressed into the refuse substantially one at a time per wheel. That is, one cutting edge at a time passes through the six o'clock position. This arrangement applies substantially one-quarter of the vehicle's weight, with the impact of movement, across each active cutting edge. The staggered arrangement of the cleat members applies a grinding action to the refuse breaking it up and crushing it as well as compacting it into the fill as the compaction vehicle 13 is driven back and forth.

Figure 8:
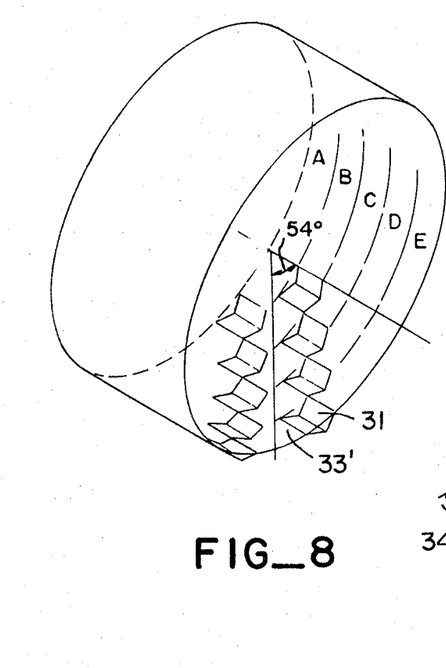
FIGURE 8 is a view like FIGURE 7 but showing the arrangement of cleat members in another preferred embodiment of the invention.
Figure 9:
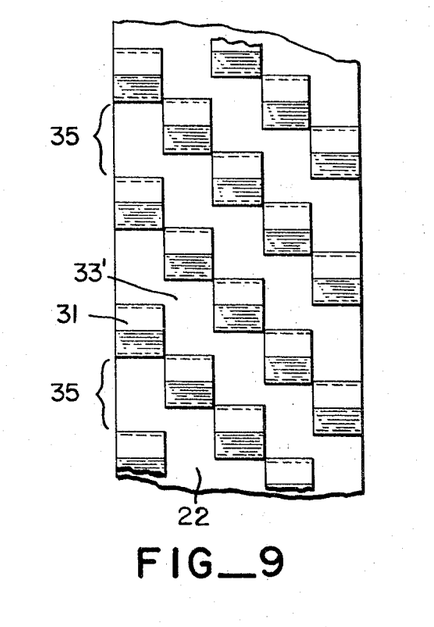
FIGURE 9 is a view like FIGURE 4 but showing the preferred embodiment of the invention of FIGURE 8.
Figure 13:
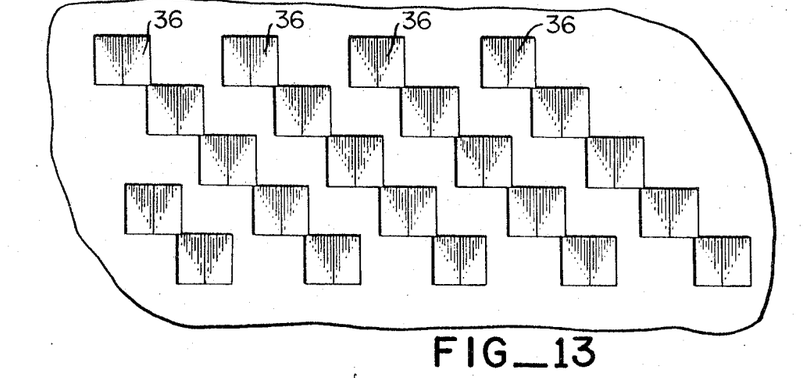

Another preferred embodiment is disclosed in FIGURES 8, 9 and 13 wherein five annular rows A, B, C, D, and E, of cleat members 31 are mounted upon the cylindrical rim or drum 22. It will be understood that this embodiment includes the following previously described members: the rigid cylindrical rim 22, the spider or diaphragm 23 equipped with hub mounting opening 24 and bolt holes 26, as well as the conical member 27 serving to define with the diaphragm 23 the ballast compartment 28 having the liquid access coupling 29. In this construction the cleat members in each row are separated circumferentially by substantially uniform gaps 35 each having a length of substantially one and one-half the base length of the cleat members measured circumferentially along the rim. The cleat members of this embodiment are like those in the preceding embodiment, viz., they are wedge-shaped members having compacting and trailing faces 31a, 31b, disposed symmetrically about a cutting edge 32 and meeting at a right angle. The wedge-shaped cleat members are staggered progressively in order of ground engaging sequence a distance equal to substantially one-half the circumferential base length of a cleat member. However, in the present embodiment the order of ground engaging sequence of the cleat members does not shift consecutively from row A through row E across the rim, but shifts among non-adjacent or non-consecutive rows. The order of ground engaging sequence is from a cleat member in row A to one in row D, to row B, to row E, to row C and then back to a second cleat member in row A. In every instance there is a gap 35 adjacent each cleat member in sequential order of ground engagement as shown in FIGURE 9. In this arrangement of cleat members and gaps 35 the full depth of the cleat member 31 may be employed as considered from the cutting edge 32 to the cylindrical surface upon which the cleat member is mounted. The overlap between cleats in adjacent rows is minimal.

An open or unobstructed slot 33' is provided in the cleat arrangement and has a similar function to the open slot 33 in the first embodiment disclosed herein. In the case of the instant embodiment, however, the dirt ejecting slot 33' is inclined at about 54° with respect to the axis of the wheel, as shown in FIGURE 8. The greater inclination of the slot 33' is intended to encourage more vigorous ejection of dirt through the slot. The cog-wheel effect created by the step-to-step contacting of the cleat members tends to be more uniform in the five row cleat arrangement than in the four row arrangement producing a smoother ride for the vehicle. This is so because there is no large shift in the ground engaging sequence of the five row arrangement from a cleat in one outside row to a cleat in the other outside row as exists in the four row arrangement. A further advantage of this five row arrangement is that there is no criss-crossing overlap between cleat members in adjacent rows as exists in the four row arrangement as shown in FIGURES 3 and 4. However, an investigation of several other patterns of cleat members revealed no other arrangements having all the desirable self-cleaning and destructive characteristics of the embodiments shown herein. It will also be appreciated that in a compaction wheel having multiple, circumferential rows of destructive cleats spaced as described herein, the number of rows should be in the range of from three to five in number in order to present only one cleat at a time to the six o'clock position.

An examplary wheel according to the prefered embodiment shown in FIGURES 8 and 9, may have a cylindrical rim 2 feet, 6 inches wide and 53½ inches in outside diameter. The cleat members may be structural angles 5 x 5 x ⅝ inches and 6 inches long spaced apart 16¹³⁄₁₆ inches, cutting edge to cutting edge, leaving about 10⅓ inches of gap over the drum surface. These cleat members have a base length of about 7 inches measured circumferentially over the rim. The stagger may be about 3½ inches between cleats in order of ground contact or about 6¾ inches between adjacent rows. Fifty angles are required, 10 for each of the five rows per wheel. It is apparent by varying the diameter of the rim the number of cleat members will vary correspondingly while maintaining the same spacings. For example for a 64½ inches diameter wheel 12 angles per row are required.

It will be recognized that in each embodiment disclosed therein there is a large contact or work area for engagement with the ground, as clearly shown in FIGURES 10 and 11. From 50% to 60% of the surface of the wheel is not covered by cleat members. The large area of contact or working area of the wheel leads to high compaction of loose fill or fluff.

The subject wheels may also be used to destroy unwanted plant growth between rows of trees in tree farms and the like. In this use the cleat members after crushing down the small plants, compress the ground into a pattern of wedge-shaped pockets, like that shown in FIGURES 12 and 13. The pattern of the pockets formed will deter water flow and thus improve resistance to erosion caused by water run-off.

Figure 14:
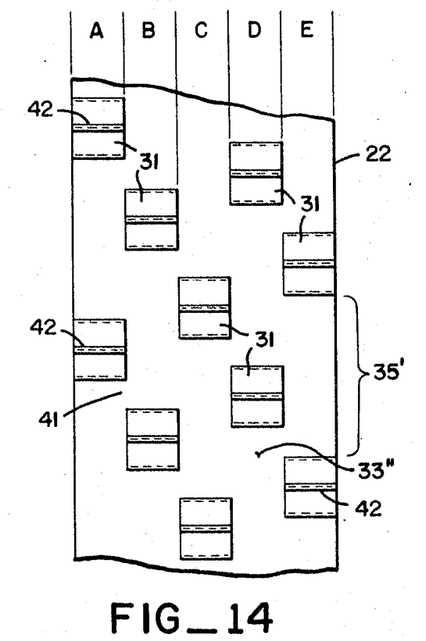
FIGURE 14 is a flat development view like FIGURE 9, but showing yet another preferred embodiment of the invention.
Figure 17:
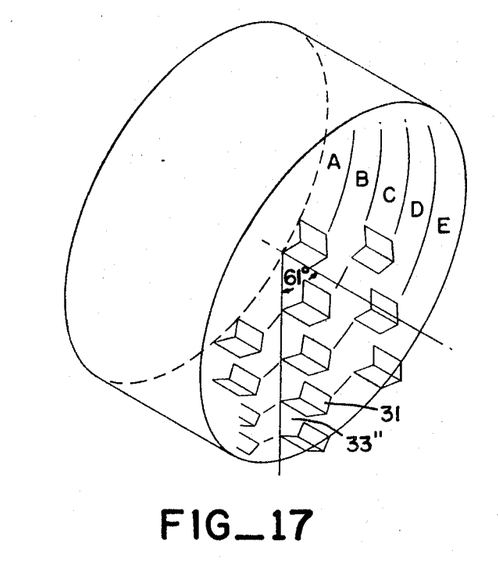
FIGURE 17 is a view like FIGURE 7 but showing the arrangement of cleat members of FIGURES 14 and 15.

Referring now to FIGURES 14 and 17 yet another preferred embodiment of the invention is shown and pertains to the cleat distribution or pattern along the cylindrical rim or drum 22. The embodiment shown in FIGURE 14 is in numerous respects similar to the two embodiments described previously herein in that the embodiment of FIGURE 14 includes wedge-shaped cleats 31 with symmetrical cleat faces as taken about the cutting edge, the cleats being arranged in a bi-directional pattern which affords an ejection slot 33" extending obliquely across the rim. The cleat members are arranged in five contiguous annular or circumferential rows, lettered A through E, and staggered so that not more than one cleat at a time on a wheel passes through the six o'clock position, the stagger between cleats of adjacent rows being less than one half the spacing between the cleats in a row. As to each cleat shown in FIGURE 14 there is provided a gap 35' adjacent each cleat to permit full cleat penetration as it goes into the ground.

The construction shown in FIGURE 14 differs from those constructions previously described in that the arrangement in FIGURE 14 is designed to further enhance cleaning action. More specifically, the ejection slot 33" has been widened from that shown in FIGURE 9 by increasing the stagger between the cleats in the order of ground engaging sequence. This has resulted in a slot having an inclination of generally 61° with respect to the wheel axis, as shown in FIGURE 17.

The stagger between cleats considered in the order of ground engaging sequence may be slightly larger than one half of the base length of the cleats as considered along the periphery of the drum 22. The ground engaging sequence of the structure shown in FIGURE 14 is first a cleat from rows A, D, B, E, C, and then a second cleat from row A.

An exemplary wheel according to the preferred embodiment shown in FIGURE 14 may have a cylindrical rim 2 feet 6 inches wide and 64½ inches in outside diameter. The cleat members may be structural angles 5 x 5 x ⅝ inches by 6 inches long and spaced apart 25⅝ inches, cutting edge to cutting edge. These cleat members have a base length of about 7 inches measured circumferentially over the rim. The stagger may be about 5 1/16 inches between cleats in order of ground contact. Forty angles are required, 8 for each of the 5 rows per wheel. It is apparent by varying the diameter of the rim, that the number of cleat members will vary correspondingly while maintaining the same spacings.

To enhance the destructive capacities of the arrangement shown in FIGURE 14, along each cutting edge of the cleat there is mounted a rectangular bar 42 rigidly secured as by welding to the cleat member 31. The bars are referred to as "grauser" bars in the industry. The bar may be constructed of hardened steel with dimensions of ½ inch by 1½ inches by 6 inches. When the cleat members are so equipped with grauser bars 42 the wheel achieves a punching action into the fill which gives it even greater destructive capacity, which is advantageous in demolition work. Another feature of the grauser bar is that it substantially retards wear to the cleat cutting edge and compaction faces and thus prolongs the life of the cleat members. The grauser bars may be added to cleats to repair blunted cutting edges.

Figure 15:
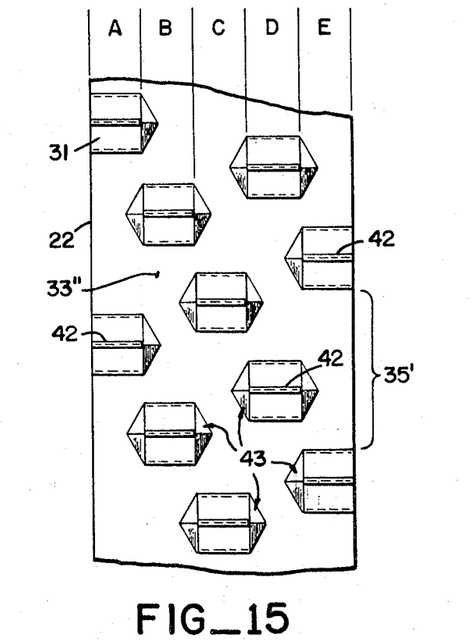
FIGURE 15 is a view like FIGURE 14, but showing still another preferred embodiment of the invention.
Figure 16:
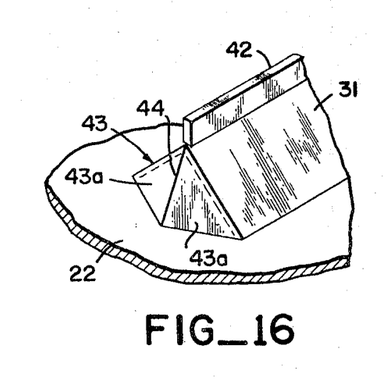
FIGURE 16 is an enlarged, fragmentary perspective view of cleat structure shown in FIGURE 15.

Referring now to FIGURES 15 and 16 another preferred embodiment of the invention is there shown which in many respects is similar to the constructions previously disclosed herein. The arrangement shown in FIGURE 15 comprises five annular and contiguous rows (A through E) of wedge shaped cleat members 31 each having symmetrical compaction faces about a cutting edge and arranged in a bi-directional pattern over the rim 22. The stagger and spacing of the cleat members 31 as shown in FIGURE 15 may be the same as that described previously in connection with FIGURE 14. Thus, the arrangement of FIGURE 15 will include an ejection slot 33" as well as a circumferential gap 35' adjacent each cleat member. The ground engaging sequence of the cleat members in FIGURE 15 is the same as that previously described in connection with those embodiments of FIGURES 9 and 14, namely: A, D, B, E, C, and then A. For increased destructive capacity each of the cleat members 31 shown in FIGURE 15 is equipped with a grauser bar 42.

Referring now to FIGURE 16 taken in connection with FIGURE 15, to enhance the cleaning action along the ejection slot 33" the end of the cleat members 31 opening onto the ejection slot, is each fitted with an end cap or end fillet 43. The end cap 43 is configurated to place along each ejection slot a sliding face 43a which is inclined both in a radially outwardly direction towards the cutting edge as well as obliquely along the ejection slot to furnish a sliding surface for the dirt being worked through the slot. The faces 43a join along a ridge 44 and thus the end caps may be considered generally to resemble an end portion or vertical section of a pyramid.

The action of the end caps in encouraging the sliding action from the dirt through the gap, is attributable, in part, to the blocking off of the open end of the cleat members to keep them free from dirt and from acting as a foundation upon which clay-like materials may bridge across the slot.

In each of the foregoing embodiments of the invention it will be understood that the wheels are self-cleaning without the aid of raker bars or cleaners such as were common in the prior art.

While there has been described what is at present considered to be the preferred embodiments of the invention, it will be understood that various modifications may be made therein, and it is intended to cover in the appended claims all such modifications as found within the true spirit and scope of the invention.

What is claimed is:

1. A wheel for a vehicle used to compact sanitary fill, comprising: a rigid cylinder forming a rim, hub-mounting means upon which the cylinder is secured, and ground-engaging, substantially V-shaped, symmetrical inverted secured to the cylinder in at least three adjacent circumferential rows, each cleat forming a cutting edge extending substantially transversely of the cylinder and inclined wedge faces, the cleats in each row being uniformly spaced and the cutting edges in the adjacent rows being staggered a distance of less than one-half the distance between the cutting edges in a row, with the spaces between cleats in adjacent rows communicating to form open, diagonally transverse slots on the surface of the cylinder for dirt ejection.

2. A wheel as in claim 1 wherein said wheel includes a concave, conically shaped member extending between said cylinder and said hub-mounting means which serves to preclude the collection of fill on the wheel.

3. A wheel as in claim 2 wherei nsaid conical member defines with said cylinder and said hub-mounting means a ballast compartment within said wheel.

4. A wheel as in claim 1 wherein said cutting edges extend substantially parallal to the axis of the wheel and are staggered a distance more than one-quarter but less than one-half the spacing between the cutting edges in each row.

5. A wheel as defined in claim 1 wherein there is included at least four circumferential rows of said cleats, the cleats being progressively staggered in sequence of ground contact in the same circumferential direction a distance at least substantially one-half the circumferential base length of a cleat.

6. The wheel as defined in claim 1 wherein said cleats have end portions forming end faces inclined from the apices of the cleats to the adjacent surface of the cylinder to facilitate ejection of dirt from the slots.

7. The wheel as defined in claim 1 wherein said cutting edges of the inverted cleats are disposed upon projections extending outwardly from the apices of the cleats.

8. A compaction wheel comprising a rigid cylinder forming a rim, means for mounting the cylinder upon a vehicle, and ground-engaging, substantially V-shaped, symmetrical, inverted cleats secured to said cylinder in at least four contiguous circumferential rows, each cleat forming a cutting edge extending substantially parallel to the axis of the wheel and inclined wedge faces, the cleats in each row being uniformly spaced, and the cutting edges in adjacent rows being staggered in the same circumferential direction so that no two cleats are in transverse axial alignment, said stagger being a distance at least substantially one-half the circumferential base-length of a cleat the spaces between cleats in adjacent rows communicating to form diagonally transverse slots on the surface of the cylinder for dirt ejection, the slots being inclined with respect to the axis of the wheel at an angle in the range from 22 to 61 degrees.

References Cited

UNITED STATES PATENTS

| 1,427,747 | 8/1922 | Ledwinka | 301—410 XR |
| 2,221,756 | 11/1940 | Burkhardt | 301—41 |
| 2,754,734 | 7/1956 | Gardiner | 94—50 |
| 3,067,658 | 12/1962 | Palmiter | 94—50 |
| 2,895,390 | 7/1959 | Gardiner | 94—50 |

FOREIGN PATENTS

| 364,034 | 12/1931 | Great Britain. |
| 656,318 | 8/1951 | Great Britain. |

JACOB L. NACKENOFF, Primary Examiner

U.S. Cl. X.R.

301—43

PO-1050
(5/69)

UNITED STATES PATENT OFFICE
CERTIFICATE OF CORRECTION

Patent No. 3,463,063      Dated August 26, 1969

Inventor(s) Fred Joseph Caron and Orville G. Barnum

It is certified that error appears in the above-identified patent and that said Letters Patent are hereby corrected as shown below:

| | |
|---|---|
| Column 4, line 41: | "anxle" should read --axle--; |
| Column 5, line 69: | "inclined" should read --incline--; |
| Column 10, line 30: | after the word "inverted" should come the word --cleats--; |
| Column 10, line 44: | "wherei nsaid" should be --wherein said--. |

SIGNED AND
SEALED
MAR 17 1970

(SEAL)
Attest:

Edward M. Fletcher, Jr.
Attesting Officer

WILLIAM E. SCHUYLER, JR.
Commissioner of Patents